April 4, 1967  G. O. HUNTZINGER  3,312,936
ELECTRICAL FLUID LEVEL INDICATING SYSTEM
Filed April 10, 1964                       3 Sheets-Sheet 1

INVENTOR.
GERALD O. HUNTZINGER
BY C. R. Meland
HIS ATTORNEY

April 4, 1967  G. O. HUNTZINGER  3,312,936
ELECTRICAL FLUID LEVEL INDICATING SYSTEM
Filed April 10, 1964  3 Sheets-Sheet 2
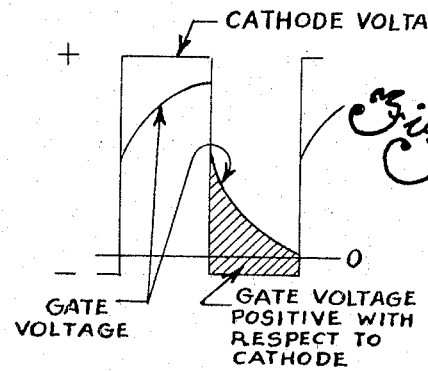
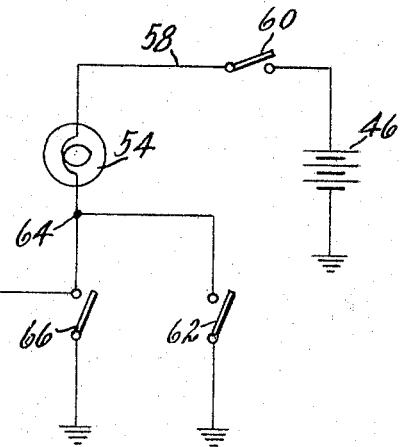
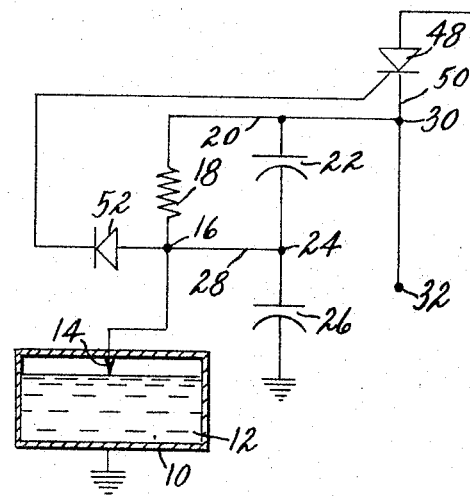
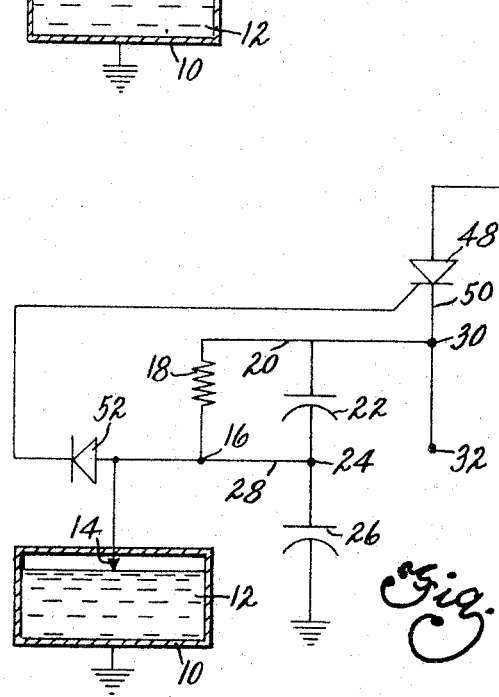
INVENTOR.
GERALD O. HUNTZINGER
BY C. R. Meland
HIS ATTORNEY April 4, 1967 G. O. HUNTZINGER 3,312,936
ELECTRICAL FLUID LEVEL INDICATING SYSTEM
Filed April 10, 1964 3 Sheets-Sheet 3
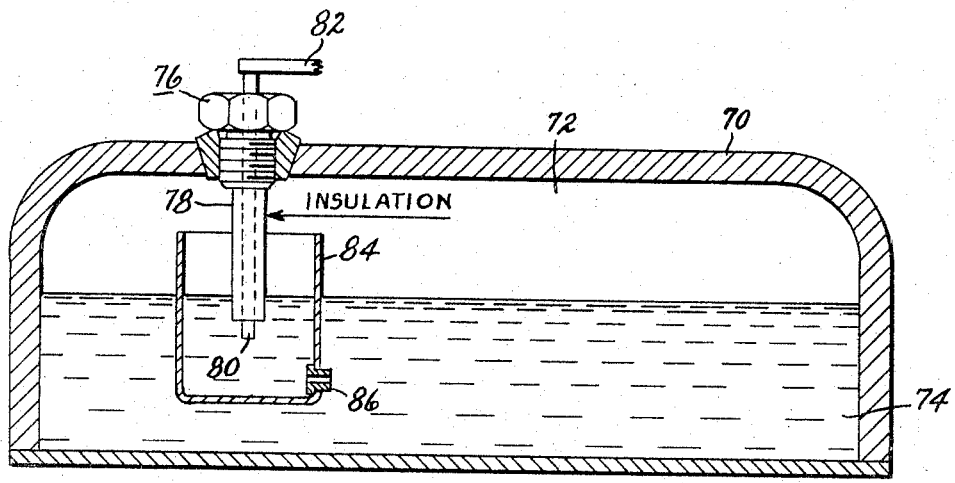
Fig. 8
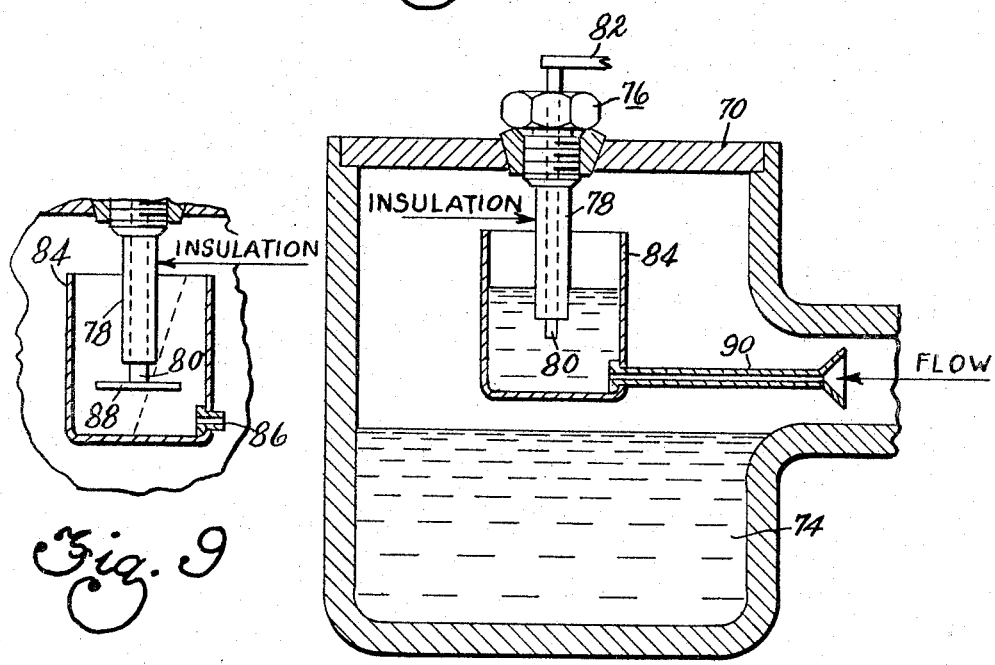
Fig. 9
Fig. 10
INVENTOR.
GERALD O. HUNTZINGER
BY C. R. Meland
HIS ATTORNEY United States Patent Office 3,312,936
Patented Apr. 4, 1967

3,312,936
ELECTRICAL FLUID LEVEL INDICATING SYSTEM
Gerald O. Huntzinger, Anderson, Ind., assignor to General Motors Corporation, Detroit, Mich., a corporation of Delaware
Filed Apr. 10, 1964, Ser. No. 358,908
5 Claims. (Cl. 340—59)

This invention relates to an electrical indicating system and more particularly to an electrical system which is capable of indicating a low coolant level on an internal combustion engine cooling system.

One of the objects of this invention is to provide an electrical system that includes a controlled rectifier and to provide a control circuit connected with the gate and cathode electrodes of the controlled rectifier which controls the conduction of the controlled rectifier and which has a variable resistance element which provides the means for varying the gate and cathode voltage of the controlled rectifier. The control circuit has a pulsating voltage applied thereto and by varying the resistance of a part of the control circuit, the conduction of the controlled rectifier can be controlled.

Another object of this invention is to provide an electrical system for indicating a low coolant condition in an internal combustion cooling system which includes a semiconductor switch connected in series with an indicating device such as a lamp and wherein an alternating voltage is applied to a circuit which includes a means for sensing coolant level and further wherein this circuit is capable of controlling the conduction of the semiconductor switch. In carrying this object forward, the semiconductor switch preferably is a controlled rectifier and the means for sensing coolant level is a probe which contacts the coolant when it is at an acceptable level. When the coolant level drops below an acceptable level, the resistance between the terminals of the probe increases sharply which causes the controlled rectifier to be switched on periodically and therefore causes an indicating lamp to become lighted.

Another object of this invention is to provide a coolant level indicating arrangement wherein an alternating voltage is applied to a circuit which includes the coolant during operation of the indicating system. This reduces the formation of deposits on the probe in the cooling liquid to a negligible amount.

Still another object of this invention is to provide a coolant level indicating system which uses a minimum of electronic components and yet achieves high sensitivity and power gain.

Still another object of this invention is to provide an indicating system which can be energized from a source of pulsating voltage that is developed across one diode of a three-phase full wave bridge rectifier network. In carrying this object forward, the output taken across one of the diodes is applied to a circuit, a component of which has a variable resistance. The output of the circuit can be used to control the switching of a semiconductor such as a controlled rectifier in response to the resistance of the component.

Further objects and advantages of the present invention will be apparent from the following description, reference being had to the accompanying drawings wherein preferred embodiments of the present invention are clearly shown.

In the drawings:

FIGURE 5 is similar to FIGURES 3 and 4 but illustrates a positive gate voltage indicated by the entire cross hatched area which occurs when the coolant level falls below an acceptable value.

FIGURE 6 is a system which is similar to FIGURE 1 but which has been modified to incorporate a lamp checking switch.

FIGURE 7 illustrates a schematic circuit diagram which is similar to FIGURE 6 but wherein the lamp has the same light intensity for coolant level and coolant temperature indications.

FIGURE 8 illustrates a coolant sensing probe arrangement which can be used with the systems of FIGURES 1, 6 and 7 and which incorporates a time delay mechanism so as to render the probe arrangement less sensitive to changes in motion of the motor vehicle.

FIGURE 9 illustrates a probe arrangement which is similar to FIGURE 8 but which has a probe which is less sensitive to changes in position or motion of the coolant chamber.

FIGURE 10 illustrates a probe arrangement which is sensitive to coolant flow.

Figure 1:
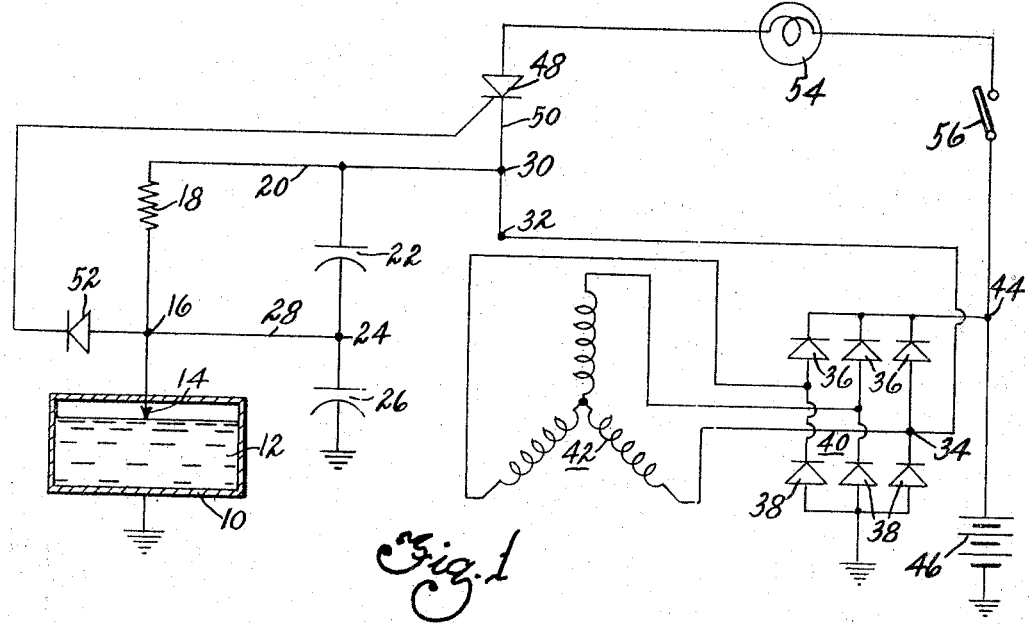
FIGURE 1 is a schematic circuit diagram of an indicating system made in accordance with this invention.

Referring now to the drawings and more particularly to FIGURE 1, the reference numeral 10 designates a metal coolant container which contains a coolant 12 such as water which can be used to cool an internal combustion engine through a conventional circulating system that can include a pump which is not illustrated. The metal container 10 which can be, for example, the upper tank of a radiator is electrically grounded. A probe 14 which is insulated from container 10 is disposed to contact the coolant 12 whenever the coolant is at an acceptable level. If the coolant for any reason drops below an acceptable level, the coolant no longer contacts the probe 14.

The proble 14 is connected with a junction 16. A resistor 18 connects the junction 16 and a conductor 20. The conductor 20 is connected to one side of a capacitor 22. The opposite side of capacitor 22 is connected with junction 24 and a second capacitor 26 connects the junction 24 and ground. A conductor 28 connects the junctions 16 and 24. The capacitors 22 and 26, the resistor 18 and the resistance between probe 14 and ground form a voltage dividing control circuit the purpose of which is more fully explained hereinafter.

The voltage dividing control circuit has input terminals formed by junction 30 and ground. The junction 30 is connected with a terminal 32. This terminal 32 is connected with junction 34 which is available on certain alternator-rectifier combinations that are used on some passenger cars as a source of direct current. Thus the terminal 32 is connected with the junction 34 located between diodes 36 and 38 of a three-phase full wave bridge rectifier network 40. The bridge rectifier network 40 is fed from a three-phase Y-connected output winding 42 of an alternating current generator. The positive output terminal of the bridge rectifier 40 is connected to junction 44 and the negative output terminal of the bridge rectifier 40 is grounded. The bridge rectifier feeds charging current to a battery 46 and other direct current loads on a motor vehicle. The generator is driven by the engine of a motor vehicle and has a field winding that is not illustrated.

Figure 2:
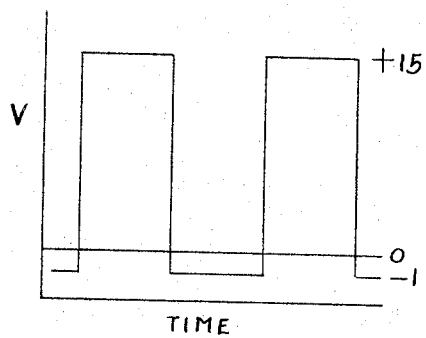
FIGURE 2 illustrates the output voltage taken across one of the diodes of the bridge rectifier illustrated in FIGURE 1.

The voltage which appears between junction 30 and ground is depicted in FIGURE 2. This voltage is shown as a perfect square wave which goes above and below a zero voltage reference line which is ground potential. In practice, this voltage is not a perfect square wave but approximates one. The voltage, by way of example and not by way of limitation, may go positive fifteen volts during a positive excursion and negative one volt during a negative excursion, all of which is depicted in FIGURE 2.

The indicator system of FIGURE 1 uses a controlled rectifier 48. The cathode of controlled rectifier 48 is connected with conductor 50 which is connected with junctions 30 and 32. A diode 52 connects the junction 16 and the gate of controlled rectifier 48. The anode of controlled rectifier 48 is connected to one side of an electrically energizable indicating device which takes the form of a signal lamp 54. The opposite side of the signal lamp is connected to one side of a manually operable switch 56, the opposite side of this switch being connected with junction 44. If desired, the switch 56 can be eliminated and a direct connection can be made between junction 44 and one side of lamp 54.

The operation of the system disclosed in FIGURE 1 will now be described with reference to the voltage wave forms shown in FIGURES 2 through 5.

When the alternator is developing an output voltage as when the engine of a motor vehicle is running, a voltage is developed between junction 30 and ground which is illustrated in FIGURE 2. This voltage is applied to the voltage dividing control circuit which includes capacitors 22 and 26, resistor 18 and resistance of the coolant 12 between probe 14 and ground. The output voltage of the circuit which can be taken between junction 16 and ground is a function of the input voltage between junction 30 and ground. In this voltage divider circuit, the high frequency components of the input signal shown in FIGURE 2 are attenuated according to the values of the capacitors 22 and 26. The low frequency components of the input signal are attenuated according to the values of the resistance 18 and the resistance between probe 14 and ground which is through the coolant 12.

Figure 3:
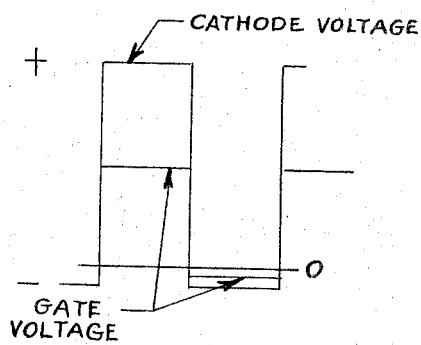
FIGURE 3 illustrates the cathode and gate voltage of the controlled rectifier shown in FIGURE 1 where the coolant level is at an acceptable value.

The ratio of capacitance of capacitors 22 and 26 is selected such that this ratio equals the ratio of the resistance of resistor 18 and the resistance appearing between probe 14 and ground when the coolant level is at an acceptable level and in contact with the probe 14. With such an arrangement, the voltage at junction 24 will be substantially an exact duplication of the voltage appearing at junction 30 except for reduced amplitude and this condition will exist for all input frequencies of the signal shown in FIGURE 2. Therefore, when the coolant is in contact with the probe 14, the voltage at junction 16 will always be less than the voltage at junction 30 and since these two voltages are applied respectively to the gate and cathode electrodes of the controlled rectifier 48, the cathode will be positive with respect to the gate during the positive excursions of the input signal of FIGURE 2. When the input signal goes through a small negative excursion, the forward voltage drop of the diode 52 absorbs the small voltage at junction 24 which could cause the gate to be positive with respect to the cathode. Thus, it is seen that the gate of controlled rectifier 48 is negative with respect to the cathode and the controlled rectifier therefore will not turn on when the coolant 12 is in contact with the probe 14. The wave form for this condition is illustrated in FIGURE 3 which shows both the cathode voltage and the gate voltage for the controlled rectifier 48. In FIGURE 3, the small voltage difference between the voltage of the gate and the voltage of the cathode during a negative excursion is absorbed by diode 52 as pointed out so that the gate is not driven positive with respect to the cathode.

If the resistance between probe 14 and ground is less than that necessary to satisfy the condition shown in FIGURE 3, there will never be a voltage on the gate of controlled rectifier 48 which is positive with respect to the cathode and the controlled rectifier 48 is never turned on. The voltage wave form for this condition is shown in FIGURE 4 where it is seen that the cathode is always positive with respect to the gate.

Figure 4:
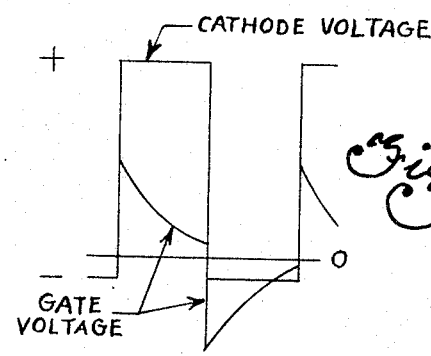
FIGURE 4 is similar to FIGURE 3 but illustrates a condition where the resistance of the probe is reduced by virtue of the coolant level being above the minimum acceptable value.

The voltage conditions shown in FIGURES 3 and 4 exist when the probe 14 contacts the coolant 12. If the level of the coolant drops below the probe, the resistance between the probe and the ground becomes very high and the voltage wave form that then occurs is shown in FIGURE 5. In this condition, each time the signal of FIGURE 2 makes a negative excursion, the voltage applied to the gate goes positive with respect to the cathode, and at the same time the anode is positive with respect to the cathode and the controlled rectifier will therefore turn on in its anode-cathode circuit and the signal lamp 54 will be energized. The controlled rectifier 48 will be turned off during each positive excursion of the voltage shown in FIGURE 5, but will turn back on during each negative excursion. Since the frequency of the signal applied to the cathode of the controlled rectifier is high, the lamp appears to glow continuously.

Referring now to FIGURE 6, a system is illustrated which is capable of indicating both a low level coolant condition and a high temperature coolant condition. In FIGURE 6, a conductor 58 is connected to one side of the signal lamp 54 and is connected to one side of a switch 60 that can be the ignition switch on a motor vehicle. The opposite side of switch 60 is connected to one side of battery 46.

In the system of FIGURE 6, a second manually operable switch 62 is provided which is connected between junction 64 and ground. This switch 62 can be operated by the same actuator that closes switch 60 and therefore can be an extra contact on the ignition switch. The switch 62 is a device for checking the continuity of the lamp 54 and when the switches 60 and 62 are closed, the lamp 54 will light provided that the lamp is not open.

In the system of FIGURE 6, the reference numeral 66 designates a conventional temperature sensing switch which is presently used to indicate a high temperature condition of the cooling system of an engine. The switch 66 is in thermal contact with coolant 12 and will close whenever the temperature of the coolant 12 is above a predetermined value.

In the system of FIGURE 6, the alternator and bridge rectifier have not been illustrated but it will be understood that the terminal 32 would be connected to a junction of two diodes in the same manner as shown in FIGURE 1 and that the bridge rectifier will supply charging current to the battery.

In FIGURE 6, the lamp 54 will be incandescent if the level of the coolant 12 drops to the point where it no longer engages probe 14 and will also be incandescent in the event that the temperature switch 66 closes. The intensity of the light emitted by the lamp 54 in FIGURE 6 will be different, however, for the different conditions to be indicated. Thus the lamp will emit more light under a temperature condition than it will under a low level coolant condition because with the low level coolant condition, the lamp is only intermittently energized whereas with the high temperature condition, the lamp is continuously energized.

Referring now to FIGURE 7, a system is illustrated which is identical with the system of FIGURE 6 with the exception that a resistor 68 is connected between junction 64 and one side of the lamp 54. In the system of FIGURE 7, the lamp 54 will have the same brilliance regardless of whether the temperature switch 66 is closed or whether the circuit is properly energized for indicating coolant level. Thus in FIGURE 7, when the temperature switch 66 is closed, the lamp 54 is energized through the resistor 68 which reduces the amount of light emitted by the lamp as compared to the FIGURE 6 embodiment.

The resistance of resistor 68 can be selected such that intermittent energization of lamp 54 through the controlled rectifier 48 will provide the same brilliance as energization of the lamp 54 through the resistor 68 and the temperature switch 66.

FIGURE 8 illustrates an apparatus for preventing false low coolant level indication and can be used with the circuits of FIGURES 1, 6 and 7. In FIGURE 8, the container for the coolant which may be the top end of a radiator is designated by reference numeral 70. The container 70 forms a coolant chamber 72 which contains a quantity of coolant 74 that can be circulated through an internal combustion engine to cool the same.

The container 70 has a threaded opening which receives a probe assembly 76. This probe assembly has an insulator 78 which houses a metal probe 80. A connector 82 is connected to the probe 80 and serves as a means for connecting the probe, for example, to junction 16 in FIGURE 1.

The tip of the probe is disposed within a cup 84 which is suitably supported within the chamber 72 as by brackets or other means not illustrated. The lower end of the cup is provided with a drain and fill hole 86. The device of FIGURE 8 is intended to provide a time delay to compensate for the considerable agitation of the coolant liquid in a motor vehicle cooling system due to vibration, circulation and various maneuvers of the vehicle such as turning, acceleration and braking. These effects could cause the coolant level to momentarily fall below the end of the probe with a device of the type shown in FIGURE 1 even through an adequate volume of coolant is present. It is desirable to prevent the lamp 54 from flashing erratically due to these momentary disturbances. This can be done by introducing a time delay into the system so that the lamp will not turn on until a suitable period of time has elapsed after the probe would normally lose contact with the coolant.

This delay is accomplished in FIGURE 8 by surrounding the probe with a cup 84 which fills and empties through a hole 86 located below the end of the probe. The size of the hole is adjusted so that the coolant liquid will readily drain and fill the cup and the hole is not likely to become stopped up with use. The volume of the cup is then adjusted to provide the desired time delay.

Under certain conditions, the probe and cup construction shown in FIGURE 8 may fail to give the desired time delay. This might occur when lateral forces on the liquid are great enough to force the liquid to the side of the cup or over the top. FIGURE 9 shows a modification of the cup and the probe which can overcome these difficulties. In FIGURE 9, the end of the probe 80 is connected with a disk 88 which is capable of contacting the coolant 74 even through the coolant be located along one side of the cup as shown by the dotted line.

It is possible to make the time delay responsive to other factors than the average level of coolant outside the cup. For example, if the cup and probe assembly is placed in the upper tank of the radiator towards the left side of the tank as viewed from the driver's seat, a left turn of the vehicle will cause the liquid in both the tank and the cup to move toward the right. Now, if the hole in the cup is located in the left side, the delay will be increased during left turns as desired. During right turns, the increased level of the liquid outside the cup prevents a decrease in delay.

If the cup is placed in the coolant where there is a flow of a liquid and the hole is oriented towards the flow, the delay will be responsive to the rate of flow as well as to the average level of liquid outside the cup. This concept can be extended to make the indicator responsive entirely to flow, if desired. This arrangement is shown in FIGURE 10 where a tube 90 is connected to the cup 84 and the end of the tube is located in a region of high flow. The cup and probe assembly is raised above the average coolant level and the impact of the flow at the end of the tube controls the liquid level within the cup.

Thus if the flow rate falls below a desired value, the liquid within the cup will fall below the end of the probe and the warning light, for example, in a system of the type shown in FIGURE 1, will be energized.

It is pointed out that the various embodiments shown in FIGURES 8, 9 and 10 can be used with any of the systems shown in FIGURES 1, 6 and 7 with the probe always being connected between junction 16 and ground.

The embodiments shown in FIGURES 8, 9 and 10 have not included a coolant circulating system for an engine but it will be understood that they are intended to be part of a conventional coolant circulating system that would include a pump connected between the radiator and the engine.

While the embodiments of the present invention as herein disclosed constitute a preferred form, it is to be understood that other forms might be adopted.

What is claimed is as follows:

1. A liquid level indicating system comprising, a circuit having a pair of input terminals, first and second capacitors having a common junction connected across said input terminals, a container, a probe means adapted to contact a quantity of liquid when said liquid is at a predetermined level in said container, a resistor, said resistor and said liquid being connected across the input terminals of said circuit and forming a part of said circuit, means connecting the junction of said resistor and said probe with the common junction of said capacitors, means for applying a pulsating voltage to the input terminals of said circuit, and a means connected with the common junction of said capacitors for indicating a condition where the liquid is out of contact with the probe.

2. The indicating system according to claim 1 where the means for indicating that the liquid is out of contact with the probe includes a controlled-rectifier having a cathode connected with one of the input terminals of the circuit and having a gate connected with the common junction of said capacitors.

3. An electrical control circuit for indicating a change in resistance of a variable resistance element comprising, first and second capacitors having a common junction, a resistor, means connecting said resistor and said variable resistance element in parallel with said capacitors, means connecting a common junction of said capacitors with a common junction of said resistor and said variable resistance element, a source of pulsating voltage connected across said capacitors and across said resistor and variable resistance element, a controlled rectifier having anode, cathode and gate electrodes, means connecting the common junction of said capacitors and the common junction of said resistor and variable resistance element with the gate electrode of said controlled rectifier, means connecting one side of said control circuit with the cathode of said controlled rectifier, and an electrically energizable indicating device connected in series with the anode-cathode circuit of said controlled rectifier, said controlled rectifier being alternatively conductive or nonconductive depending upon the reistance of said variable resistance element.

4. An electric circuit for controlling the firing of a controlled rectifier in accordance with the resistance of a variable resistance element comprising, a control circuit having a pair of input terminals and an output terminal, said control circuit including a pair of capacitors connected in series across said input circuit and having a junction forming an output terminal for said control circuit, a resistor, said resistor and variable resistance element forming parts of said control circuit and being connected across the input terminals of said control circuit, means connecting the junction of said resistor and said variable resistance element with the junction of said capacitors and with the output terminal of said control circuit, a source of pulsating voltage, means connecting said source of pulsating voltage across the input terminals of said control circuit, means connecting the gate electrode of said controlled rectifier with said output terminal, means connecting one side of said source of pulsating voltage with the cathode of said controlled rectifier, and an electrical load connected in series with the anode-cathode circuit of said controlled rectifier, said controlled rectifier being alternatively conductive or nonconductive depending upon the resistance of said variable resistance element.

5. An electrical circuit for indicating a variable resistance condition of a variable resistance element on a motor vehicle comprising, an alternating current generator having a three phase output winding, a three phase full wave bridge rectifier network connected with said output winding, a direct current load energized from the output terminals of said bridge rectifier network, a controlled rectifier having anode, cathode and gate electrodes, a control circuit including said variable resistance element, said control circuit comprising a bridge circuit including a pair of series connected capacitors and a resistor connected in series with said variable resistance element, a junction of said variable resistor element and said resistor being connected to a junction of said capacitors, means connecting the input terminals of said control circuit across one of the diodes of said bridge rectifier network, means connecting said junctions of said control circuit with the gate of said controlled rectifier, and an electrical load connected in series with the anode and cathode electrodes of said controlled rectifier, said electrical load being energized in accordance with the conduction or nonconduction of said controlled rectifier, said controlled rectifier being biased alternatively to conductive or nonconductive conditions by the output signal of said control circuit which depends upon the resistance of said variable resistance element.

References Cited by the Examiner
UNITED STATES PATENTS

| | | | |
|---|---|---|---|
| 2,744,177 | 5/1956 | Barber | 340—59 X |
| 3,206,615 | 9/1965 | LaPointe | 340—244 |

NEIL C READ, *Primary Examiner.*

A. WARING, *Assistant Examiner.*